(12) United States Patent
Chen et al.

(10) Patent No.: US 12,413,089 B2
(45) Date of Patent: Sep. 9, 2025

(54) ELECTRONIC DEVICE, CHARGING METHOD FOR ELECTROCHEMICAL DEVICE, TERMINAL AND STORAGE MEDIUM

(71) Applicant: Ningde Amperex Technology Limited, Fujian (CN)

(72) Inventors: Maohua Chen, Fujian (CN); Hongmei Wei, Fujian (CN); Yuansen Xie, Fujian (CN)

(73) Assignee: NINGDE AMPEREX TECHNOLOGY LIMITED, Ningde (CN)

( * ) Notice: Subject to any disclaimer, the term of this patent is extended or adjusted under 35 U.S.C. 154(b) by 752 days.

(21) Appl. No.: 17/708,766

(22) Filed: Mar. 30, 2022

(65) Prior Publication Data

US 2022/0224141 A1    Jul. 14, 2022

Related U.S. Application Data

(63) Continuation of application No. PCT/CN2020/106782, filed on Aug. 4, 2020.

(51) Int. Cl.
*H02J 7/00* (2006.01)
*H01M 10/052* (2010.01)
*H01M 10/44* (2006.01)

(52) U.S. Cl.
CPC ..... *H02J 7/007182* (2020.01); *H01M 10/052* (2013.01); *H01M 10/44* (2013.01); *H01M 2220/30* (2013.01)

(58) Field of Classification Search
CPC .............. H02J 7/007182; H02J 7/0048; H02J 7/00714; H02J 7/00718; H02J 7/007184;
(Continued)

(56) References Cited

U.S. PATENT DOCUMENTS 7,456,610 B2 * 11/2008 Yamashita ................ H02J 7/04
320/158
9,065,292 B2 * 6/2015 Yazami ............ H02J 7/007184
(Continued)

FOREIGN PATENT DOCUMENTS

CN          101958437 B     1/2013
CN          104037464 A     9/2014
(Continued)

OTHER PUBLICATIONS

Office Action issued on Nov. 15, 2023, in corresponding Chinese Application No. 202210355202.2, 12 pages.
(Continued)

*Primary Examiner* — M Baye Diao
(74) *Attorney, Agent, or Firm* — Maier & Maier, PLLC

(57) ABSTRACT

An electronic device, a charging method for an electrochemical device, a terminal and a storage medium. The electronic device includes an electrochemical device that satisfies the following features: in a first stage of a charging process, a state of charge (SOC) of the electrochemical device being less than or equal to X, 70%≤X<100%. An average charging current when the SOC of the electrochemical device is less than or equal to 40% is A, an average charging current when the SOC of the electrochemical device is between 40% and X is B, and A<B. The electronic device can improve the cycle life of the corresponding electrochemical device with a charging time close to that of the current fast charging.

9 Claims, 4 Drawing Sheets

(58) Field of Classification Search
CPC ............... H01M 10/052; H01M 10/44; H01M 2220/30; H01M 4/134; H01M 2004/027; H01M 4/382; H01M 4/405; Y02E 60/10
USPC .......................................................... 320/137
See application file for complete search history.

(56) References Cited

U.S. PATENT DOCUMENTS

| | | | |
|---|---|---|---|
| 9,893,542 B2* | 2/2018 | Hwang | H02J 7/0049 |
| 10,320,038 B2* | 6/2019 | Nomura | H02J 7/04 |
| 10,886,766 B2* | 1/2021 | Luo | H02J 7/007184 |
| 11,139,509 B2* | 10/2021 | Konopka | H02J 7/00711 |
| 11,283,103 B2* | 3/2022 | Hong | H01M 10/0525 |
| 11,316,161 B2* | 4/2022 | Kwon | H01M 4/0445 |
| 11,424,492 B2* | 8/2022 | Mikhaylik | H01M 10/425 |
| 11,831,186 B2* | 11/2023 | Sherstyuk | H02J 7/0071 |
| 12,126,203 B2* | 10/2024 | Miyaki | H02J 7/007 |
| 2012/0043929 A1* | 2/2012 | Yazami | H02J 7/007184 320/160 |
| 2016/0118818 A1* | 4/2016 | Yamauchi | H02J 7/007182 320/152 |
| 2017/0194672 A1* | 7/2017 | Weber | H01M 10/052 |
| 2018/0134168 A1 | 5/2018 | Keller et al. | |
| 2018/0233943 A1* | 8/2018 | Koizumi | B60L 7/18 |
| 2019/0084399 A1* | 3/2019 | Ohara | H01M 4/505 |
| 2019/0221895 A1 | 7/2019 | Konopka et al. | |
| 2019/0237974 A1* | 8/2019 | Dang | H02J 7/00714 |
| 2020/0136173 A1 | 4/2020 | Hong et al. | |
| 2023/0006215 A1* | 1/2023 | Chen | H01M 4/667 |

FOREIGN PATENT DOCUMENTS

| | | |
|---|---|---|
| CN | 105162181 A | 12/2015 |
| CN | 105264654 A | 1/2016 |
| CN | 106876813 A | 6/2017 |
| CN | 107146918 A | 9/2017 |
| CN | 107612162 A | 1/2018 |
| CN | 109037811 A | 12/2018 |
| CN | 109728371 A | 5/2019 |
| CN | 110098646 A | 8/2019 |
| CN | 110190348 A | 8/2019 |
| EP | 0981194 A2 | 2/2000 |
| JP | 2000106219 A | 4/2000 |
| JP | 2007141493 A | 6/2007 |
| JP | 2016510360 A | 4/2016 |
| JP | 2017152356 A | 8/2017 |
| JP | 2019525009 A | 9/2019 |
| JP | 2021511625 A | 5/2021 |
| KR | 102160272 B1 * | 9/2020 .......... H01M 4/5825 |
| WO | 2008154956 A1 | 12/2008 |
| WO | 2012019185 A2 | 2/2012 |
| WO | 2017115605 A1 | 7/2017 |

OTHER PUBLICATIONS

Office Action issued on Nov. 15, 2022, in corresponding Japanese Application No. 2021-516670, 11 pages.
Office Action issued on Jul. 25, 2023, in corresponding Japanese Application No. 2021-516670, 12 pages.
Extended European Search Report issued on Jun. 30, 2022, in corresponding European Application No. 20936099.9, 8 pages.
International Search Report issued on May 11, 2021 in corresponding International application No. PCT/CN2020/106782; 6 pages.
Chinese First Office Action issued on Oct. 27, 2021 in corresponding application No. 202080004737.4; 15 pages.
Chinese Notification to Grant Patent Right issued on Jan. 18, 2022 in corresponding application No. 202080004737.4; 7 pages.

* cited by examiner

In a first stage of a charging process, a state of charge (SOC) of the electrochemical device is less than or equal to X, 70%≤X<100%, an average charging current when the SOC of the electrochemical device is less than or equal to 40% is A, an average charging current when the SOC of the electrochemical device is between 40% and X is B, and A<B.  — S101

ELECTRONIC DEVICE, CHARGING METHOD FOR ELECTROCHEMICAL DEVICE, TERMINAL AND STORAGE MEDIUM

CROSS-REFERENCE TO RELATED APPLICATIONS

The present application is a bypass continuation application of PCT application PCT/CN2020/106782, filed on Aug. 4, 2020, the disclosure of which is hereby incorporated by reference in its entirety.

TECHNICAL FIELD

This application relates to the field of electronic technologies, and in particular, to an electronic device, a charging method for an electrochemical device, a terminal and a storage medium.

BACKGROUND

Among all metal elements, lithium metal has a minimum relative atomic mass (6.94) and a lowest standard electrode potential (−3.045 V), and its theoretical gram capacity can reach 3860 mAh/g. Therefore, the use of the lithium metal as an anode of an electrochemical device, together with some high energy density cathode materials, can greatly improve energy density of the electrochemical device and an operating voltage of the electrochemical device. During charging of a lithium-metal battery, lithium may deposit on a surface of the anode. Due to high chemical reactivity of the lithium metal, it may react with electrolyte in a deposition process to form a solid electrolyte interface (SEI) film. With the continuous deposition of the lithium metal, the anode expands in volume and the original SEI may rupture, resulting in local electric field non-uniformity, which leads to preferential deposition of the lithium metal at the positions and formation of lithium dendrites. On the one hand, the formation of the lithium dendrites may continue to consume the electrolyte, resulting in shortage of the electrolyte of the lithium metal battery. On the other hand, in a delithiation process, lithium dendrites are very likely to lose electrical contact with the main lithium metal, resulting in the loss of active lithium and increasing the impedance of the lithium metal battery. This may seriously affect cycle performance of the lithium metal battery, causing serious cycle attenuation of the lithium metal battery.

SUMMARY

This application improves high-rate charging performance of an electrochemical device (e.g., a lithium metal battery) by optimizing a charging flow, and can improve the cycle life of the electrochemical device at similar charging times.

An embodiment of this application provides an electronic device, including an electrochemical device that satisfies following features: in a first stage of a charging process, a state of charge (SOC) of the electrochemical device being less than or equal to X, 70% $\leq$X<100%. An average charging current when the SOC of the electrochemical device is less than or equal to 40% is A, an average charging current when the SOC of the electrochemical device is between 40% and X is B, and A<B.

In the electronic device, in the charging process, an anode of the electrochemical device includes lithium metal or an alloy of lithium metal.

In the electronic device, in addition to lithium, the alloy of lithium metal further includes an element M that includes at least one of Na, Al, Mg, Si, K, Ga, Fe, Zn, Ag, Y, Sb, In, Sn, or B.

In the electronic device, the charging process further includes a second stage when the SOC of the electrochemical device is between Y and 100%, X$\leq$Y$\leq$100%, and constant-voltage charging is employed in the second stage.

In the electronic device, in the first stage, the charging current is in a step ascending pattern, the number of steps is n$\geq$2, and charging times of the steps are the same or different.

In the electronic device, the step ascending pattern includes the charging times of the steps being the same or charging capacities of the steps being the same.

In the electronic device, in the first stage, the charging current is in a continuous ascending pattern or in a periodic pattern in which the charging current first ascends continuously and then remains constant.

An embodiment of this application further provides a charging method for an electrochemical device, including: in a first stage of a charging process, an SOC of the electrochemical device being less than or equal to X, 70% $\leq$X<100%, setting an average charging current when the SOC of the electrochemical device is less than or equal to 40% to A, setting an average charging current when the SOC of the electrochemical device is between 40% and X to B, and A<B.

An embodiment of this application further provides a terminal, including: at least one memory and at least one processor. The at least one memory is configured to store program code, and the at least one processor is configured to call the program code stored by the at least one memory to perform the charging method described above.

An embodiment of this application further provides a storage medium, configured to store program code for performing the charging method described above.

By controlling a charging current in a charging process and regulating growth behaviors of lithium, this application can improve cycle performance of the electrochemical device with only a short charging time (for example, fast charging). That is, the electronic device of this application can improve the cycle life of the corresponding electrochemical device with a charging time close to that of the current fast charging.

DETAILED DESCRIPTION

Figure 1:
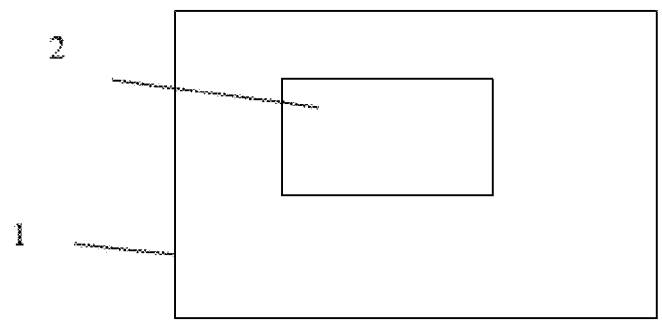
FIG. 1 is a schematic view of an electronic device according to an embodiment of this application.

Following embodiments enable those skilled in the art to more fully understand this application, but do not limit this application in any manner.

Currently, the lithium metal battery further faces following problems urgently to be solved. 1) Lithium metal is extremely active, especially newly generated lithium metal, and is very prone to a series of side reactions with existing organic small molecule electrolytic liquid systems, resulting in that the lithium metal and the electrolyte are consumed at the same time, cycle coulomb efficiency is generally less than 99.5%. In a traditional liquid electrolyte system, the cycle coulomb efficiency is generally less than 90%, which is much lower than that of a general graphite anode system (more than 99.9%). 2) During charging of the lithium metal battery, lithium may deposit on the surface of the anode. Due to the non-uniformity of the current density and the concentration of lithium ions in the electrolyte, some sites may be deposited too fast during deposition, thereby forming a sharp dendrite structure. The existence of lithium dendrites may lead to significant reduction of deposition density, resulting in the decrease of energy density, and in serious cases, may pierce a separator to form a short circuit, causing safety problems. 3) With charge-discharge of the anode of the lithium metal, a thickness of an anode plate may be drastically expanded and contracted. Thicknesses of expansion and contraction are related to the amount of an active substance per unit area of the anode and a specific capacity of the active substance, as well as density of lithium deposition and a volume of side reaction products. According to general design of a current commercial lithium ion battery, a thickness of a single-sided lithium metal anode in case of full charge may vary from 8 μm to 100 μm with respect to full discharge. This may cause an interface between the anode plate and a less flexible inorganic protective coating to peel off and lose a protective effect. 4) A charging rate is lower. In case of a high charging rate, the deposition of the lithium metal is more prone to a non-uniform phenomenon, which intensifies the growth of the lithium dendrites, decreases a particle size of the lithium metal, and increases a side reaction area with the electrolyte, resulting in acceleration of consumption of the electrolyte and the lithium metal, acceleration of cycle attenuation, or even a sharp decline.

Currently, in order to reduce side reactions between the lithium metal and the electrolyte, inhibit the growth of the lithium dendrites, and solve interface peeling and protective layer breaking caused in the expansion and contraction process, following methods are mainly adopted. 1) Method of protection in advance: Before assembly of the electrochemical device, one or more stable protective layer structures are deposited on a surface of the lithium metal anode by physical or chemical methods. Such protective layers are stable to lithium, can conduct lithium ions, and isolate direct contact between the electrolyte and the lithium metal, thus reducing side reactions. If the protective layer has higher mechanical strength, it can also inhibit the growth of the lithium dendrites. However, due to a rapid volume change of the anode during the charging and discharging the harder materials covering the surface of the anode are prone to breaking, resulting in a continuous decrease in use. 2) Method for generating a protective layer in situ: Some special additives are added to the electrolyte to make it chemically react with the lithium metal to form a more stable SEI film, preventing further occurrence of the side reactions. However, in general, the additives may be constantly lost during the charging and discharging and after the additives are completely lost, their protective effect may disappear. 3) anode skeleton: The use of a 3D current collector or a porous anode skeleton can provide enough space for lithium deposition and reduce volume changes of the anode during the charging and discharging. However, this method still does not significantly improve formation, destruction, and regeneration of the SEI, which limits coulombic efficiency and cycle performance of the electrochemical device.

It may be understood that the electrochemical device according to this application includes, but is not limited to, common lithium metal batteries, i.e., batteries with an anode formed of lithium metal or an alloy of lithium metal, and further includes lithium ion batteries (changed to lithium metal batteries during charging) with an anode containing lithium metal or an alloy of lithium metal due to extraction of lithium on the surface of the anode during charging. For example, the anode is a traditional material such as graphite or silicon-based materials, but CB is far less than 1. At the beginning of charging, no lithium metal is produced on the surface of the anode. However, as the anode is filled with lithium to a point that $LiC_6$ and C cannot contain lithium ions, extraction of lithium begins on the surface of the cathode, and the battery becomes a lithium metal battery. $CB=(M'*N'*O')/(M*N*O)\geq 1.4$. M denotes a mass ratio of a cathode active substance to a cathode active substance layer, N denotes a gram capacity of the cathode active substance, in mAh/g, and O denotes the mass of the cathode active substance layer per unit area, in $mg/cm^2$. M' denotes a mass ratio of an anode active substance to an anode active substance layer, N' denotes a gram capacity of the anode active substance, in mAh/g, and O' denotes the mass of the anode active substance layer per unit area, in $mg/cm^2$.

As shown in FIG. 1, an embodiment of this application provides an electronic device 1. The electronic device includes an electrochemical device 2. The electronic device 1 according to the embodiment of this application is not specifically defined and may be used for any electronic device known in the prior art. In some embodiments, the electronic device may include, but is not limited to, a notebook computer, a pen-input computer, a mobile computer, an e-book player, a portable phone, a portable fax machine, a portable duplicator, a portable printer, a head-mounted stereo headphone, a video camera, a liquid crystal TV, a portable cleaner, a portable CD player, a mini disc, a transceiver, an electronic notepad, a calculator, a memory card, a portable recorder, a radio, a standby power supply, a motor, an automobile, a motorcycle, a power-assisted bicycle, a bicycle, a lighting appliance, a toy, a game console, a clock, an electric tool, a flash light, a camera, a large household storage battery, and a lithium ion capacitor. In some embodiments, the electrochemical device according to this application includes, but is not limited to, lithium metal batteries or lithium ion batteries that change into lithium metal batteries during charging.

In some embodiments, the electronic device 2 according to this application satisfies following features: in a first stage of a charging process, an SOC of the electrochemical device being less than or equal to X, 70%≤X<100%. An average charging current when the SOC of the electrochemical device is less than or equal to 40% is A, an average charging current when the SOC of the electrochemical device is between 40% and X is B, and A<B. That is, in the first stage when the SOC of the electrochemical device is less than or equal to X (70%<X<100%), the charging current in the later period (40%≤SOC≤X) is greater than that in the early period (SOC≤40%), and the cycle life of the electrochemical device can be improved under a condition of satisfying a similar charging time of large-rate charging.

Figure 2:
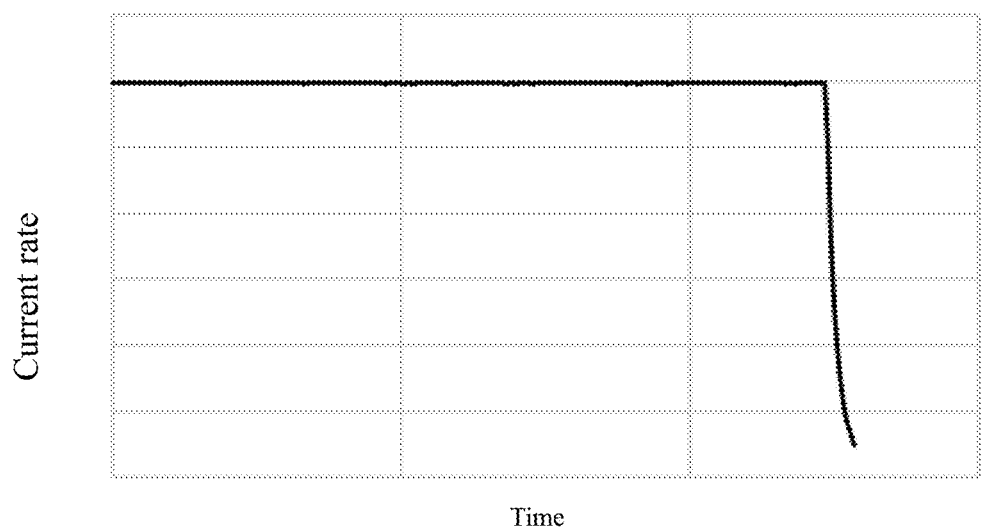
FIG. 2 is schematic views of current rate changes over time according to an embodiment of this application.

This is completely different from a general lithium ion battery charging method shown in FIG. 2. In the charging method of this application, the SOC increases with the progress of charging. In the first stage of the charging process, the charging current in the later period is greater than that in the early period. This is because at a low SOC, the lithium metal needs to overcome more energy for nucleation. Therefore, a high rate is easy to bring greater polarization, which leads to the increase of local electric field non-uniformity, the intensification of the growth of the lithium dendrites and the increase of side reactions, and finally leads to a greatly shortened cycle life of the electrochemical device. However, in the case of a high SOC and sufficient nucleation sites, the electrochemical device can support a greater charging rate. Therefore, by increasing the charging current in the later period, the cycle life of the electrochemical device can be improved at a similar charging time.

In some embodiments, in the charging process, an anode of the electrochemical device includes lithium metal or an alloy of lithium metal. In some embodiments, the anode of the electrochemical device may be lithium metal or an alloy of lithium metal, that is, the anode of the electrochemical device is formed by lithium metal or an alloy of lithium metal. In some embodiments, the anode of the electrochemical device may be conventional graphite or the like, but with the progress of the charging process, lithium metal is deposited on the anode, so that the surface of the anode is lithium metal or an alloy of lithium metal, which becomes a lithium metal battery. For the electrochemical device with the anode including lithium metal or an alloy of lithium metal, if the conventional charging method is adopted, that is, constant large current, the electrolyte and the lithium metal may be consumed too fast, and lithium dendrites may be generated, which reduces the cycle life of the electrochemical device.

In some embodiments, in addition to lithium, the alloy of lithium metal may further include M that includes at least one of Na, Al, Mg, Si, K, Ga, Fe, Zn, Ag, Y, Sb, In, Sn, or B. By using the alloy of lithium metal, the activity of the lithium metal can be reduced and the occurrence of side reactions can be reduced.

In some embodiments, the charging process further includes a second stage when the SOC of the electrochemical device is between Y and 100%, X 100%, and constant-voltage charging is employed in the second stage. Due to the large resistance when the electrochemical device is nearly fully charged, constant-voltage charging can be adopted from the perspective of safety and prevention of overcharging.

Figure 3:
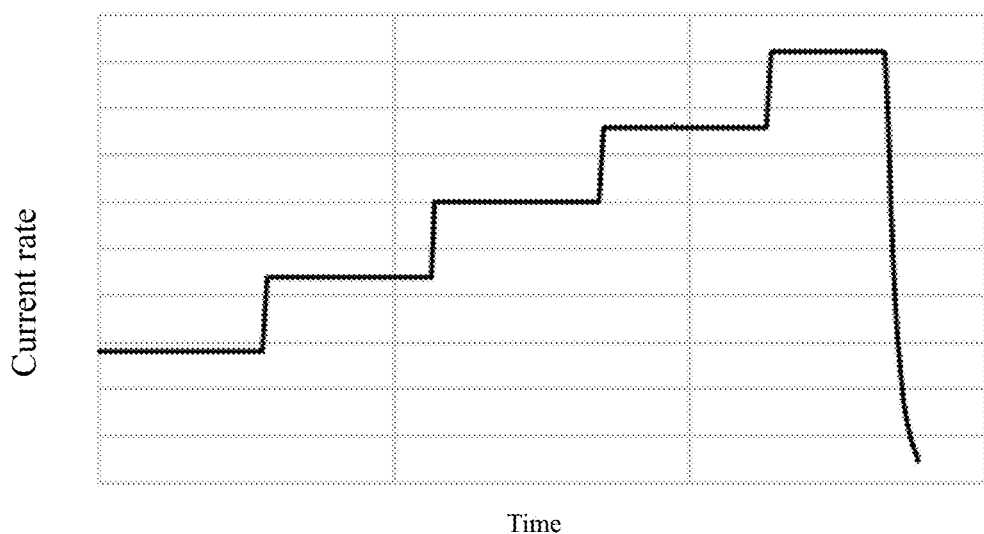
FIG. 3 is schematic views of current rate changes over time according to an embodiment of this application.
Figure 4:
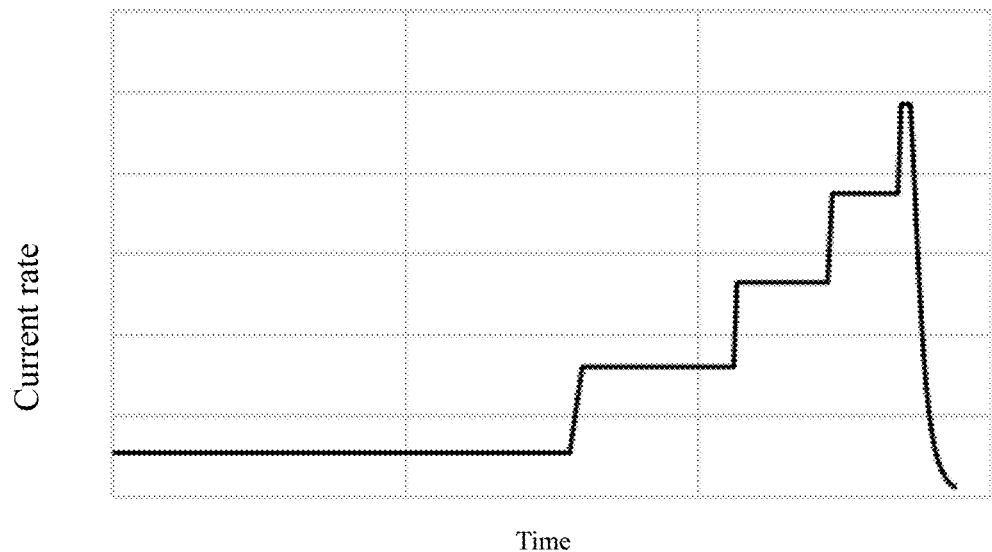
FIG. 4 is schematic views of current rate changes over time according to an embodiment of this application.

In some embodiments, in the first stage, the charging current is in a step ascending pattern, the number of steps is n≥2, and charging times of the steps are the same or different. FIG. 3 and FIG. 4 illustrate schematic charging methods of current changes over time according to Embodiment 1 and Embodiment 8 respectively. By increasing the charging current step by step, the cycle life of the electrochemical device can be improved at a similar charging time. This is because at a low SOC, the lithium metal needs to overcome more energy for nucleation. Therefore, a high rate is easy to bring greater polarization, which leads to the increase of local electric field non-uniformity, the intensification of the growth of the lithium dendrites and the increase of side reactions, and finally leads to a greatly shortened cycle life of the electrochemical device. So, a smaller charging current is adopted at the low SOC to avoid the above problems. However, in the case of a high SOC and sufficient nucleation sites, the electrochemical device can support a greater charging rate, thereby reducing the charging time and improving the cycle life of the electrochemical device.

In some embodiments, the step ascending pattern includes the charging times of the steps being the same or charging capacities of the steps being the same. With such an ascending pattern, it is easy to control the charging process and charging management of the electrochemical device.

Figure 5:
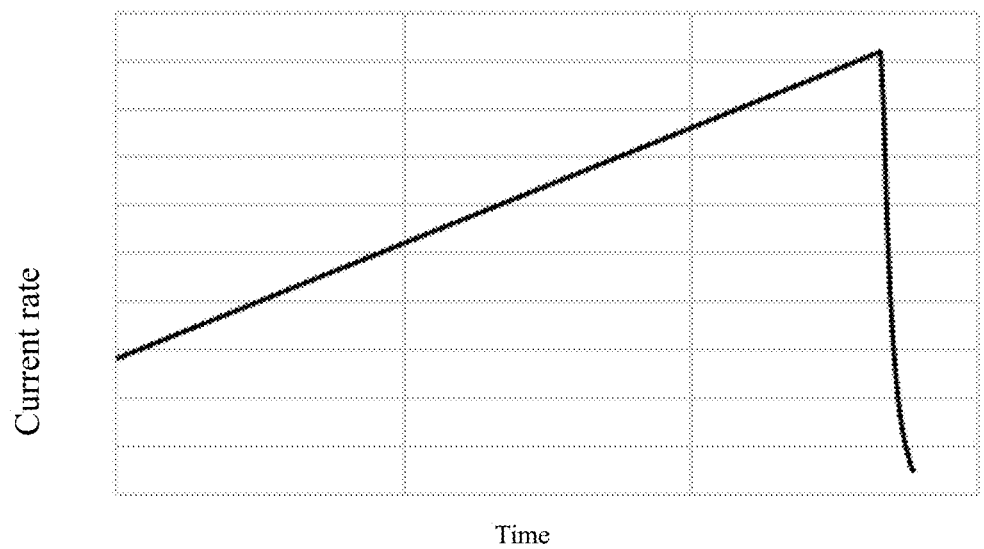
FIG. 5 is schematic views of current rate changes over time according to an embodiment of this application.
Figures 6, 7:
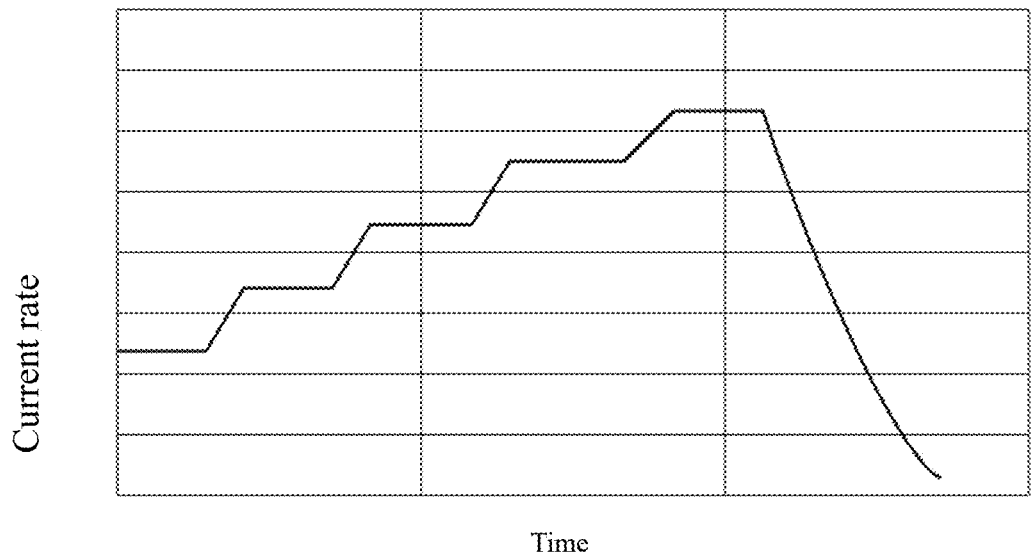
FIG. 6 is schematic views of current rate changes over time according to an embodiment of this application.
FIG. 7 is a schematic flow chart of a charging method according to an embodiment of this application.

In some embodiments, in the first stage of the charging process, the charging current is in a continuous ascending pattern or in a periodic pattern in which the charging current first ascends continuously and then remains constant. FIG. 5 and FIG. 6 illustrate the two patterns respectively.

As shown in FIG. 1, an embodiment of this application further provides a charging method for an electrochemical device, including step S101: in a first stage of a charging process, an SOC of the electrochemical device being less than or equal to X, 70%≲X<100%, setting an average charging current when the SOC of the electrochemical device is less than or equal to 40% to A, setting an average charging current when the SOC of the electrochemical device is between 40% and X to B, and A<B. In some embodiments, in the charging process, an anode of the electrochemical device includes lithium metal or an alloy of lithium metal.

In the charging method of this application, the SOC increases with the progress of charging. In the first stage of the charging process, the charging current in the later period is greater than that in the earlier period. In this way, problems such as the growth of lithium dendrites and the increase of side reactions caused by an excessive current in the early period can be avoided, and the cycle performance of the electrochemical device can be improved. In addition, since the current in the later period of the first stage is larger, it also meets the requirement of large-rate charging and saves the charging time. Therefore, by increasing the charging current in the later period, the cycle life of the electrochemical device can be improved at a similar charging time. The charging method of this application is particularly suitable for electrochemical devices such as lithium metal batteries.

In addition, this disclosure further provides a terminal, including: at least one memory and at least one processor. The at least one memory is configured to store program code, and the at least one processor is configured to call the program code stored by the at least one memory to perform the charging method described above. It may be understood that the terminal in the embodiment of the disclosure may include, but is not limited to, a notebook computer, a pen-input computer, a mobile computer, an e-book player, a portable phone, a portable fax machine, a portable duplicator, a portable printer, a head-mounted stereo headphone, a video camera, a liquid crystal TV, a portable cleaner, a portable CD player, a mini disc, a transceiver, an electronic notepad, a calculator, a memory card, a portable recorder, a radio, a standby power supply, a motor, an automobile, a motorcycle, a power-assisted bicycle, a bicycle, a lighting appliance, a toy, a game console, a clock, an electric tool, a flash light, a camera, a large household storage battery, and a lithium ion capacitor.

In addition, the disclosure further provides a computer storage medium storing program code for performing the charging method described above. The computer storage medium according to this application may be a computer-readable signal medium or a computer-readable storage medium or any combination of the two. The computer-readable signal medium may be, for example, but is not limited to, electrical, magnetic, optical, electromagnetic, infrared, or semiconductor systems, apparatuses or devices, or any combination of the above. More specific examples of the computer-readable storage medium may include, but are not limited to, an electrical connection having one or more conductors, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any appropriate combination of the above.

It may be understood that the preparation method of lithium metal batteries or lithium ion batteries that are converted to lithium metal batteries during charging is not limited, which may be prepared by a known method. For example, the anode plate, the separator, and the cathode plate are sequentially wound or stacked into electrode assembly, and then loaded into, for example, aluminum-plastic films for packaging, electrolyte is injected, and a lithium ion battery or lithium metal battery is made by forming and packaging. An anode of the lithium metal battery is generally lithium metal or an alloy of lithium metal.

Some specific embodiments and comparative examples are listed below to better illustrate this application.

Embodiment 1

Preparation of an anode plate: An anode current collector is copper foil of 12 μm and is covered by lithium foil with a thickness of 50 μm on both sides, and an anode plate is cut into a size of (40 mm*60 mm) for use.

Preparation of a cathode plate: A cathode active substance $LiNi_{0.5}Co_{0.2}Mn_{0.3}O_2$, conductive agent conductive carbon black and binder polyvinylivinylifluoride (PVDF) are dissolved in an N-methylpyrrolidone (NMP) solution with a ratio of 97.5:1.0:1.5 by weight, and are prepared into a cathode slurry with solid content of 0.75, which is stirred evenly. Aluminum foil is used as a cathode current collector, and the cathode slurry is coated on the cathode current collector. After drying, cold pressing and cutting (38 mm*58 mm) at 90° C., the cathode plate is obtained.

Preparation of electrolyte: In a dry argon atmosphere, first, dioxycyclopentane (DOL) and dimethyl ether (DME) are mixed at a volume ratio of 1:1 to obtain an organic solvent. Then lithium salt bis-trifluoromethyl sulfonate (LiTFSI) is added into the organic solvent to dissolve and mix evenly to obtain electrolyte with lithium salt concentration of 1 M.

Preparation of a lithium metal battery: Polyethylene (PE) with a thickness of 15 μm is selected as a separator. The anode plate, the separator, and the cathode plate are sequentially stacked so that the separator plays a role of separating the anode plate from the cathode plate. The total number of layers of the anode plate and the cathode plate is 31. After stacking, four corners of the entire laminated structure are fixed with adhesive tapes and placed into an aluminum-plastic film. After top side sealing, liquid injection, and packaging, a lithium metal laminated battery is finally obtained. A pressure of 0.5 MPa is evenly applied to the battery through a fixture for subsequent tests.

Preparation methods in Embodiments 2 to 10 and Comparative Examples 1 to 3 are the same as the preparation method in Embodiment 1, except that the charging process is different. Comparative Examples 4 to 5 are for common lithium ion batteries and differ from Example 1 only in the preparation of the anode plate and the electrolyte. Preparation of an anode plate in Comparative Examples 4 to 5: The current collector is copper foil and has a thickness of 10 μm. An anode active substance is graphite, a conductive agent is acetylene black, and a binder is styrene butadiene rubber and sodium carboxymethyl cellulose. The anode active substance, acetylene black, styrene butadiene rubber and sodium carboxymethyl cellulose are mixed according to a mass ratio 96:1:1.5:1.5 and then dispersed in deionized water to form slurry which is stirred evenly, coated on copper foil, and dried to form an anode active substance layer. The anode active substance layer has a thickness of 45 μm. An anode plate is obtained after cold pressing and slitting. Preparation of electrolyte according to Comparative Examples 4 to 5: In an environment where moisture content is less than 10 ppm, lithium hexafluorophosphate and non-aqueous organic solvent (ethylene carbonate (EC): diethyl carbonate (DEC): propylene carbonate (PC): propyl propionate (PP), and ethylene carbonate (VC)=20:30:20:28:2, a mass ratio) are prepared according to a mass ratio 8:92 to form electrolyte with lithium salt concentration of 1 mol/L.

The charging process according to Embodiment 1 is as follows: A laminated battery is formed into a circle at a charging and discharging rate of 0.1 C at 60° C., and charging and discharging cycles are carried out at room temperature. The charging process is divided into a constant current (CC) stage and a constant pressure (CV) stage. In the CC stage, the initial current is 0.08 C, the stage is divided into five steps, each step is charged for 0.5 hours with constant current, and the currents are 0.08 C, 0.24 C, 0.40 C, 0.56 C, and 0.72 C respectively. In the CC stage, 4.40 V is used as a cut-off voltage. When a voltage reaches the cut-off voltage, an electrode assembly enters the CV stage and a cut-off current is 0.05 C. A constant discharge rate is 1 C, and the cut-off voltage is 2.80 V. Differences between parameters in the charging processes according to Embodiments 1 to 10 and Comparative Examples 1 to 5 are shown in Table 1.

The following describes a test method for cycle performance of this application:

The test temperature is 25° C., a capacity obtained from first charging is taken as an initial capacity, and a capacity attenuation curve is obtained by taking a ratio of a capacity of each cycle to the initial capacity. The number of cycles up to a capacity retention of 80% at 25° C. is recorded as room-temperature cycle performance of the electrode assembly.

Table 1 shows various parameters and evaluation results of embodiments and comparative examples.

TABLE 1

|  | Charging time | Charging method | Starting rate | Number of steps | Ending rate | Number of cycles maintained under 80% capacity |
|---|---|---|---|---|---|---|
| Comparative Example 1 | 2.5 h | Average | 0.4 C | 1 | 0.4 C | 50 |
| Comparative Example 2 | 2.5 h | Equal time but descend | 0.61 C | 5 | 0.19 C | 25 |
| Comparative Example 3 | | Direct CV | | | | 20 |
| Comparative Example 4 | | Lithium ion battery, 1 h, ascend | | | | Extraction of lithium |
| Comparative Example 5 | | Lithium ion battery, 1 h, descend | | | | Without extraction of lithium |
| Comparative Example 6 | | The current is continuously increased from 0 to 0.8 C (equivalent to charging to 20% SOC) for 0.5 h, and then gradually decreased at a rate of 0.4 C per hour | | | | 30 |
| Embodiment 1 | 2.5 h | Equal time | 0.08 C | 5 | 0.72 C | 100 |
| Embodiment 2 | 2.5 h | Equal time | 0.13 C | 5 | 0.67 C | 115 |
| Embodiment 3 | 2.5 h | Equal time | 0.19 C | 5 | 0.61 C | 120 |
| Embodiment 4 | 2.5 h | Equal time | 0.24 C | 5 | 0.56 C | 115 |
| Embodiment 5 | 2.5 h | Equal time | 0.33 C | 5 | 0.47 C | 80 |
| Embodiment 6 | 2.5 h | Equal time | 0.14 C | 9 | 0.46 C | 123 |
| Embodiment 7 | 2.5 h | Equal time | 0.14 C | Continuous | 0.46 C | 125 |
| Embodiment 8 | 2.5 h | Equal capacity | 0.11 C | 5 | 0.97 C | 90 |
| Embodiment 9 | 4 h | Equal time | 0.11 C | 5 | 0.39 C | 160 |
| Embodiment 10 | 2 h | Equal time | 0.19 C | 5 | 0.81 C | 100 |

Comparative Example 1 is a conventional CC-CV test, the number of cycles maintained under 80% capacity was only 50, and the cycle performance is poor. This is because the initial charging current is larger, more lithium dendrites are generated, side reactions are increased, the electrolyte is accelerated, and the cycle performance attenuation is faster.

It can be known from the comparisons between Embodiments 1 to 5 and Comparative Example 2 that for the same charging time, in Comparative Example 2, the initial charging current is larger, the cycle performance is poor, the number of cycles maintained under 80% capacity is only 25, while in Embodiments 1 to 5, the number of cycles is basically about 100. Therefore, with the charging method in this application, the cycle performance of the electrochemical device can be greatly improved at a similar charging time.

A large current is employed at the beginning of the cycle in Comparative Example 2. Compared with Comparative Example 1, the generation of lithium dendrites and the generation of side reactions are worse, and the cycle performance decreases sharply.

In Comparative Example 3, the current decreases from large to small when charging is carried out directly by CV. Compared with Comparative Example 1, the generation of lithium dendrites and the generation of side reactions are worse, the number of cycles maintained under 80% capacity is only 20, and the cycle performance decreases sharply.

In Comparative Example 4, for lithium ion batteries, when the charging current keeps increasing, extraction of lithium may occur. In Comparative Example 5, no extraction of lithium occurs when the charging current of the lithium ion battery decreases continuously.

In Comparative Example 6, when the charging current is below 20% SOC, the charging current increases continuously and then decreases. The number of cycles maintained under 80% capacity is only 30, and the cycle performance is poor. This is because when the SOC is below 20%, an excessive charging current is likely to lead to the growth of lithium dendrites and the occurrence of side reactions. If the current is too small when the SOC is below 20% and then the current is reduced, this may damage rate charging performance and fails to meet the purpose of fast charging.

It can be known from the comparisons between Embodiments 1 to 5 that, as the initial current increases, cut-off current components decrease, and the number of cycles first increases and then decreases. The number of cycles first increasing is due to the decrease in the cut-off current. The large current in the later period has a certain deterioration effect on the cycle performance of the electrochemical device. Therefore, as the cut-off current continues to decrease, the cycle performance may be improved. However, with the further increase of the initial current, the growth of lithium dendrites in the early period gradually plays a dominant role in a negative effect, which leads to the deterioration of the cycle performance.

It can be known from the comparisons between Embodiments 6 to 7 that, when the number of steps is greater than 5, with the increase of the number of steps, the cycle performance of the electrochemical device is slightly improved, but not significantly.

In Embodiment 8, when the current growth manner is changed, that is, the duration of each step is different, the cycle performance is still improved relative to Comparative Example 1.

In Embodiment 9, the cycle performance of the electrochemical device is further improved by increasing the charging time of each step.

In Embodiment 10, by reducing the charging time of each step, the number of cycles is reduced but is still improved relative to the conventional CC-CV charging method according to Comparative Example 1.

Only preferred embodiments of this application and the technical principles used are described above. It may be understood by those skilled in the art that the scope of disclosure involved in this application is not limited to the technical solution formed by a specific combination of the above technical features, but may also cover other technical solutions formed by any combination of the above technical features or equivalents thereof, for example, the technical solution formed by the substitution of the above features with the technical features with similar functions disclosed in this application.

What is claimed is:

1. An electronic device, comprising an electrochemical device that satisfies following features:
   in a first stage of a charging process, a state of charge (SOC) of the electrochemical device being less than or equal to X, 70%≤X<100%, wherein, an average charging current when the SOC of the electrochemical device is less than or equal to 40% is A, an average charging current when the SOC of the electrochemical device is between 40% and X is B, and A<B;
   wherein the first stage of the charging process transitions to a second charging stage of the charging process when the SOC of the electrochemical device reaches X;
   in the second stage of the charging process, the SOC of the electrochemical device is between Y and 100%, wherein X≤Y≤100%, and constant-voltage charging is employed in the second stage.

2. The electronic device according to claim 1, wherein, an anode of the electrochemical device comprises lithium metal or a lithium alloy.

3. The electronic device according to claim 2, wherein, the anode of the electrochemical device comprises the lithium alloy; and the lithium alloy comprises an element M; the element M comprises at least one of Na, Al, Mg, Si, K, Ga, Fe, Zn, Ag, Y, Sb, In, Sn, or B.

4. The electronic device according to claim 1, wherein, in the first stage, the charging current is in a step ascending pattern, the number of steps is n≥2.

5. The electronic device according to claim 4, wherein, the step ascending pattern comprises the charging times of the steps being the same or charging capacities of the steps being the same.

6. The electronic device according to claim 1, wherein, in the first stage, the charging current is in a continuous ascending pattern or in a periodic pattern in which the charging current first ascends continuously and then remains constant.

7. A method for charging an electrochemical device, comprising:
   in a first stage of a charging process, a state of charge (SOC) of the electrochemical device being less than or equal to X, 70%≤X<100%, setting an average charging current when the SOC of the electrochemical device is less than or equal to 40% to A, setting an average charging current when the SOC of the electrochemical device is between 40% and X to B, and A<B;
   transitioning from the first stage of the charging process to a second charging stage of the charging process when the SOC of the electrochemical device reaches X;
   in the second stage of the charging process, the SOC of the electrochemical device is between Y and 100%, wherein X≤Y≤100%, and a constant-voltage charging is employed in the second stage.

8. A terminal, comprising:
   at least one memory and at least one processor;
   wherein, the at least one memory is configured to store program code, and the at least one processor is configured to call the program code stored by the at least one memory to perform the charging method according to claim 7.

9. A storage medium, configured to store program code for performing the charging method according to claim 8.

* * * * *